June 25, 1963  C. PRIESMEYER  3,094,920
EGG MARKER
Filed June 1, 1959  2 Sheets-Sheet 1
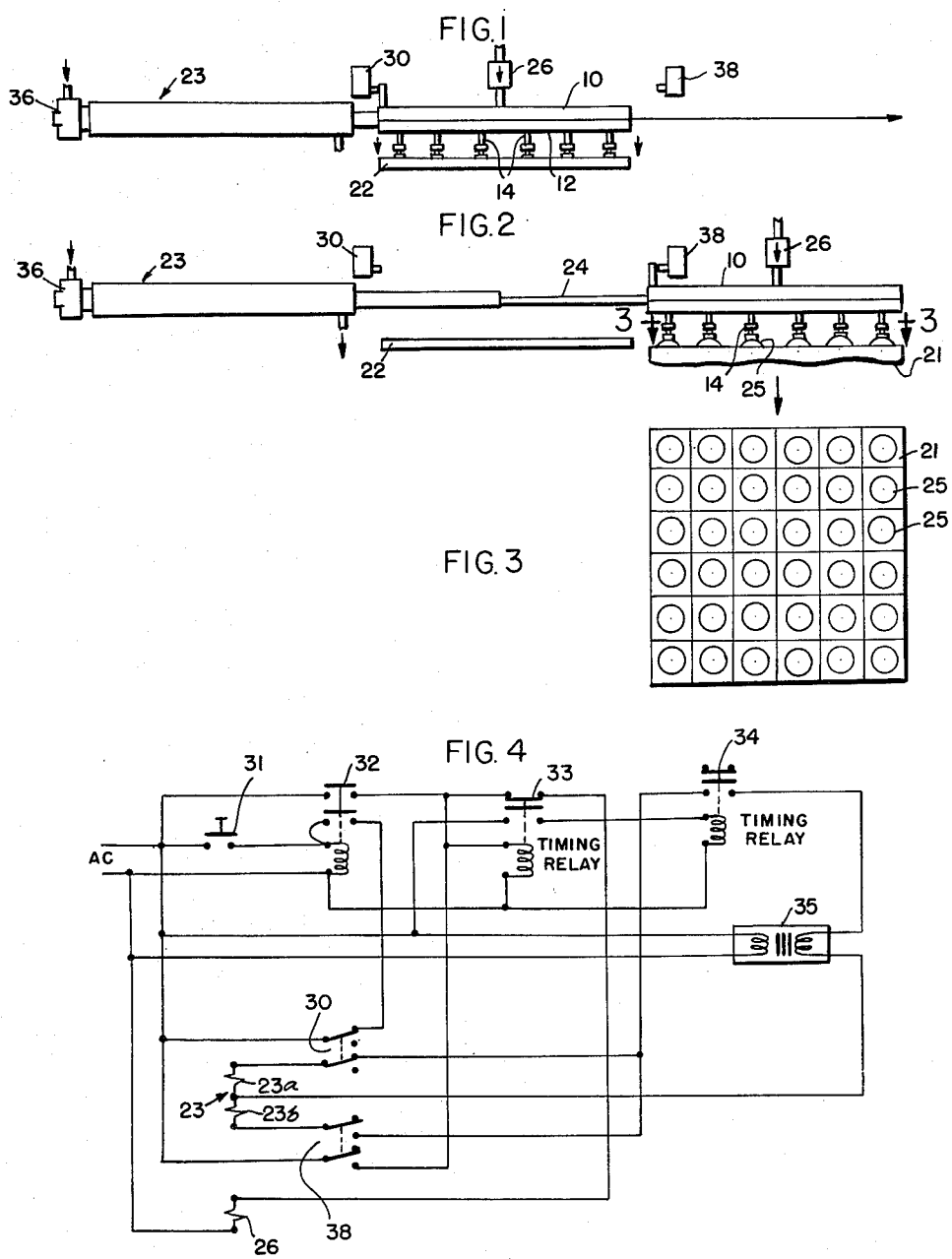
INVENTOR:
CHARLES PRIESMEYER
BY
ATT'Y June 25, 1963

C. PRIESMEYER 3,094,920

EGG MARKER

Filed June 1, 1959

INVENTOR:
CHARLES PRIESMEYER
BY
ATT'Y

3,094,920
EGG MARKER
Charles Priesmeyer, Park Ridge, Ill., assignor to Meyer & Wenthe, Inc., Chicago, Ill., a corporation of Illinois
Filed June 1, 1959, Ser. No. 817,165
4 Claims. (Cl. 101—41)

The present invention is related to marking apparatus. More particularly, it has to do with apparatus for marking eggs.

In the processing of eggs, the eggs usually are subjected to one or more examinations for the purpose of grading them according to size and quality. It is sometimes desired to mark the eggs in a manner to indicate the assigned grade in these respects. The need for marking the eggs may also arise in other instances. For example, there may be a requirement that eggs be marked to indicate the date on which they were produced. In certain countries, the processor may be required to mark imported eggs to indicate that fact.

Because of the delicate shell, an egg marking device must of course make its impression while yet contacting the egg gently. The requirements of delicacy become more complex when it is attempted to at least partly mechanize the marking operation. In particular, it has been found desirable to mark an entire crate of eggs at a time. Automatic or semi-automatic marking apparatus for handling entire crates of eggs becomes proportionally more heavy and bulky; yet, the feature of delicacy must be maintained.

Contributing further to the problems of mass marking is the fact that it is most difficult and very inconvenient to arrange the eggs in their crates so that all are aligned or oriented in the same manner so as to permit proper engagement of uniform marking dies with the surfaces of each and all of the eggs. Moreover, the contour of the individual eggs vary somewhat, adding further to the problem of obtaining accurate printing engagement between the die and the egg surface.

It is accordingly a general object of the present invention to provide egg marking apparatus which overcomes the foregoing problems and which gently and accurately applies a printing die against an egg.

Another object of the present invention is to provide a new and improved egg marking apparatus which automatically aligns the die characters with different egg surfaces of varying position, shape and contour.

A further object of the present invention is to provide a new and improved egg marking apparatus which is capable of versatile use, allowing simple interchange of different die characters.

Still another object of the present invention is to provide a new and improved egg marking apparatus which is capable of automatically marking a plurality of eggs on an assembly line basis with substantially equal printing contact pressure, regardless of variation in size or some relative displacement in a carton. Further, in doing so, perform the operation while the eggs are in their packed positions so that when unpacked all markings are readily seen for inspection.

Egg marking apparatus constructed in accordance with the present invention preferably includes a plunger movable endwise relatively toward an egg. A printing die is spaced beyond the end of the plunger in a position to face the egg. The die is coupled to the plunger by means including a universal joint. In use for mass marking of eggs, the apparatus includes means for pneumatically driving a plurality of the plungers toward the eggs, resting in a crate or the like, in order to engage the die against the surface of the eggs. A motor driving system and valve means are inter-related in operation by a control system in order to move the dies back and forth between an ink pad and a marking position.

The features of the present invention which are believed to be novel are set forth with particularity in the appended claims. The organization and manner of operation of the invention, together with further objects and advantages thereof, may best be understood by reference to the following description taken in conjunction with the accompanying drawings in which:

FIG. 1 is a fragmentary elevational view of egg marking apparatus constructed in accordance with the present invention;

FIG. 2 is a view similar to that shown in FIG. 1 but with the parts in a different position;

FIG. 3 is a view taken along the line 3—3 in FIG. 2;

FIG. 4 is a schematic wiring diagram of a control system associated with the apparatus of FIGS. 1 and 2;

Figure 5:
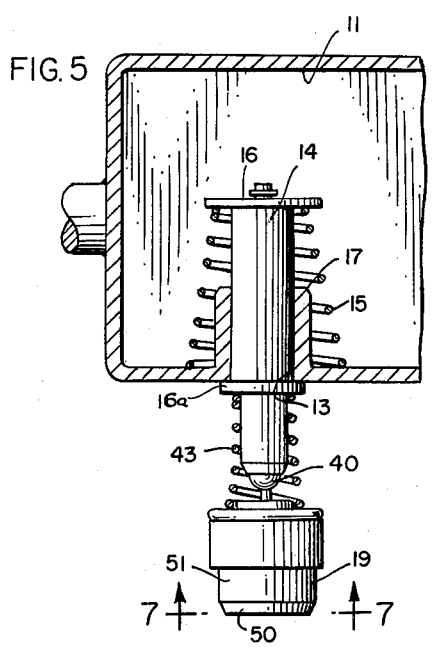
FIG. 5 is a fragmentary cross-sectional view of a detailed feature of the apparatus shown in FIG. 1.

The embodiment of the present invention shown in the drawings for purposes of illustration includes a housing 10 defining a closed chamber 11 (FIG. 5). The planar under wall 12 of housing 10 has a plurality of openings 13 in which a corresponding plurality of plungers 14 are slidably disposed for limited endwise movement individually in the respective openings.

Figure 7:
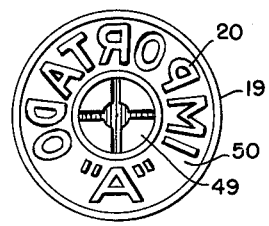
FIG. 7 is a view taken along the line 7—7 in FIG. 5.

Movement of plungers 14 in openings 13 is limited in a retracted direction, as illustrated, by shoulder 16a on the plunger 14 engaging the bottom surface of the housing under the tension of a spring 15 resting on the top of the bottom wall of the housing and engaging the flange 16 projecting laterally outward from the inner end surface of plunger 14; accordingly, spring 15 acts to urge the plungers inwardly of the chamber with the force corresponding to the spring constant. Outward movement of plunger 14 is limited by engagement of flange 16 with the facing shoulder 17 of an inturned sleeve defining an extension of and aligned with opening 13. On the lower or exposed end of each of the plungers a printing die 19 is affixed. Die 19 includes die-characters 20 (FIG. 7) forming a suitable legend or other indicia with which it is desired to mark the eggs.

When assembled for operation, the apparatus is located adjacent a support 21 upon which the eggs 25 to be marked are at rest. Conveniently, support 21 takes the form of an egg crate capable of holding a standard number of eggs as indicated in FIG. 3. Support 21 may in turn be carried by a conveyor, if desired.

Disposed alongside support 21 is an ink pad of conventional nature. Its purpose is to supply a meagre but sufficient supply of ink to the printing die character surface upon engagement of the latter with the inking surface of the pad.

The apparatus includes means for moving housing 10 between a position overlying support 21 and a position overlying ink pad 22. To this end, a reversible drive or motor 23 has a piston 24 coupled to housing 10. Extension of piston 24 outwardly of motor 23 moves housing 10 from a position in alignment with ink pad 22 to a position over support 21. The positioning is reversed upon withdrawal of piston 24.

In order to drive plungers 14 toward eggs 25 gently and yieldingly, the plungers are driven outwardly of chamber 11 pneumatically. To this end, chamber 11 is coupled to a valve 26 controllable to admit into the chamber air under pressure sufficient to overcome the compressive strength of spring 15. The driving air pressure is itself resilient as the result of which the printing die is driven most gently against the surface of eggs 25. All plungers receive the same amount of pressure whether they move out a long or short distance to engage the eggs, and the pressure upon the eggs is substantially equal regardless of the plunger extension.

Associated with the apparatus of FIGS. 1 and 2 is a control system as illustrated in FIG. 4. The control system includes means responsive to movement of housing 10 into its position over ink pad 22 for actuating valve 26 to drive the dies into engagement with and then withdraw the same from the ink pad. To this end, the system includes a microswitch 30 having two pairs of normally open contacts and positioned to have its plunger depressed by housing 10 upon arrival of the latter into a position properly overlying ink pad 22. Associated with microswitch 30, in a manner presently to be described, is a start button 31, a start relay 32, a first timing relay 33, and a second timing relay 34. Timing relays 33 and 34 are of a well known type incorporating a delay action; that is, upon energization of the coils of either of these timing relays, a short time interval elapses prior to commencement of movement of their movable contacts.

The system is responsive to withdrawal of the dies from ink pad 22 to initiate movement of the housing into its second position. In the present instance, reversible motor 23 is preferably an air motor and the control system actuates a control valve 36 coupled to a suitable source of air under pressure to pass air in a controllable direction into the air motor in order to effect movement of piston 24.

The system further includes means responsive to movement of the housing into its position over support 21 to actuate valve 26 and thereby effect movement of printing dies 19 into engagement with the eggs after which the dies are withdrawn. To this end, a microswitch 38 is positioned to sense arrival of housing 10 into marking position over support 21. Microswitch 38, like microswitch 30, includes two normally open contact pairs. Finally, the control system is arranged to constitute means responsive to withdrawal of the dies from the eggs to move the housing into its original position overlying ink pad 22. This is achieved through suitable interconnection of the various components mentioned and in a manner about to be described.

The sequence of operation will best be understood by reference to FIG. 4, keeping in mind the relative positions of the components as shown in FIGS. 1 and 2. To begin with, assume a point in the cycle of operation wherein housing 10 has just returned from its egg-marking position and has arrived over ink pad 22, depressing the plunger of microswitch 30 to close its contacts as indicated in FIG. 4.

The sequence of operation is begun by closing switch 31 to energize the coil of relay 32 from a source of alternating current. Of course, switch 31 may be manually operated or may take the form of a microswitch or the like engaged or otherwise actuated by the appearance of a crate of eggs in position to be marked. Energization of relay 32 completes a hold circuit through the now closed upper contacts of microswitch 30. Also completed is an energization circuit for timing relay 33. Simultaneously, a circuit is completed through the normally closed contacts of timing relay 33 to energize valve 26 as the result of which plunger 14 are driven downwardly to dispose the printing dies against the ink pad.

Upon completion of the delay interval of timing relay 33, the contacts of the latter shift whereupon the circuit energizing valve 26 is broken. In consequence, plungers 14 retract to withdraw the printing dies to their upward position. At the same time, a circuit is completed through the contacts of timing relay 33 to energize the coil of timing relay 34. After a delay sufficient to permit substantially complete withdrawal of plungers 14, the contacts of timing relay 34 close to complete a circuit from the secondary of a transformer 35 to supply energy to and thereby energize the coil 23a of air motor 23, whereupon piston 24 is projected to move housing 10 to the position indicated in FIG. 2 in which it is disposed over support 21. Upon release of microswitch 30 during this operation, the hold circuit on relay 32 is broken to in turn break the circuits energizing timing relays 33 and 34, shifting all relay contacts back to the position illustrated; with housing 10 in position over support 21, the contacts of microswitch 30 are open while those of microswitch 38 are now closed.

Upon closing of the contacts of microswitch 38, the coil of timing relay 33 is energized and the circuit is once again completed to effect actuation of valve 26 whereupon plungers 14 are driven downwardly to impress the dies against the eggs. Upon the subsequent movement of the contacts of timing relay 33 into their energized position, the circuit to valve 26 is opened whereupon the plungers are retracted. Simultaneously, timing relay 34 is energized. Upon expiration of its timing interval, to insure complete retraction of the dies away from the eggs, a circuit is completed through the upper contacts of microswitch 38 to energize a winding 23b on air motor 23. In consequence, piston 24 is retracted to move housing 10 and its plungers back to the position shown in FIG. 1, one complete cycle having been completed.

Figure 6:
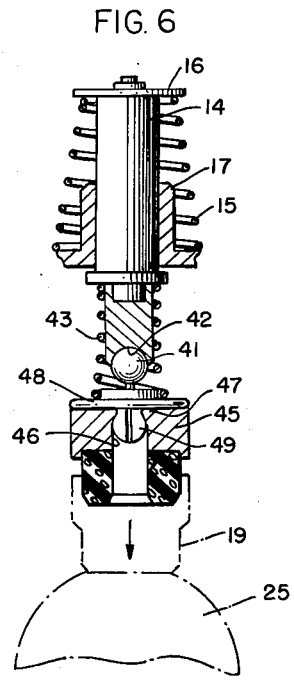
FIG. 6 is a fragmentary cross-sectional view of the apparatus shown in FIG. 5.

As thus far explained, it will be observed that the apparatus disclosed is capable of automatically marking a multiplicity of eggs in one operation. It will be appreciated, however, that in usual practice the eggs are not all similarly oriented in their resting places but tilt in various directions. In addition, the egg contours vary. To the end of obtaining accurate alignment between the printing die and the surface to be marked, the die is coupled to the lower end portion of the plunger by a universal joint 40. Joint 40 includes a rigid spheroid or ball 41 movably disposed in and grasped within a socket 42 formed in the lower end of an element secured to the bottom of plunger 14. Preferably, joint 40 is biased to a predetermined attitude or center position, as indicated in FIGS. 5 and 6, by a spring 43 coupled between plunger 14, on one side of joint 40, and the printing die assembly, on the other side of joint 40. Thus, as contact is made with the respective eggs the joint 40 permits movement of the die.

To permit convenient and easy interchange of one printing die for another, joint 40 is preferably coupled to the printing die assembly by a snap-on fastener. The printing die includes a base 45 having a central opening 46 defining a necked-down portion 47. Ball 41 is secured to a connecting member 48 from which project a plurality of resilient prongs 49, each having an outwardly facing hump such that, upon insertion of the prongs into opening 46, the hump engages the inner surface of the opening beyond and behind necked-down portion 47 to fasten the printing die in place on the plunger assembly.

Figure 8:
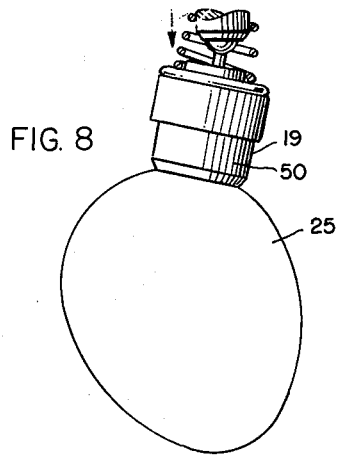
FIG. 8 is a fragmentary view of the apparatus shown in FIG. 5 with the lower portion thereof in engagement with an egg.

As the printing dies are driven downwardly toward the egg, printing die 19 is centered to correctly engage an egg positioned perfectly upright as indicated in FIG. 6. However, should the egg be tilted to one side as indicated in FIG. 8, universal joint 40 permits a compensating tilt of the printing die whereupon the die characters 20 assume the correct printing position. Should the egg be tilted to the other side as indicated in FIG. 9, once again joint 40 acts to permit automatic alignment of the printing die characters with the surface upon which marking is desired.

Figure 9:
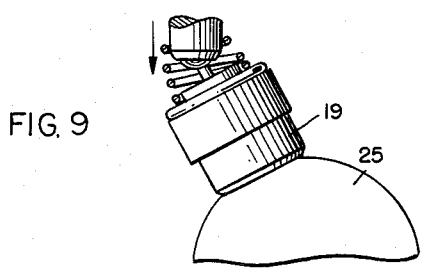
FIG. 9 is a view similar to FIG. 8 but with the parts in a different position.

Should a particular egg be unusually long so as to expose a printing die engaging surface elevated a substantial amount more than usual, it will be observed by reference to FIG. 9 that movement of the plunger downwardly may tend to rock the printing die to one side as the plunger reaches it bottom position if the movement limit of joint 40 is surpassed. This tendency for misprinting or mis-operation may be compensated by assigning to spring 43 a spring constant such that, as printing die 19 is swiveled away from its center position, and approaches the maximum extent of movement permitted by joint 40, the compressive force of spring 43 reaches a value equalling the pneumatic driving force on plunger 14. To provide equal compensation in all direction, it is preferred that spring 43 be wound about and over joint 40 to resist movement of the die equally in all directions away from its normal central position or attitude.

The surfaces presented by the eggs to the dies not only vary in contour from one egg to the next but also vary depending upon the orientation of the egg in its support. To assist in obtaining proper alignment of the die characters with the varying concave contours presented thereto, the die characters preferably are formed of rubber or the like which is cemented or otherwise secured to a sponge rubber cushion 51 in turn affixed on base 45. To permit precise compensation of the orientation of the individual die characters, the latter preferably are disposed in a circular arrangement on the outwardly facing end surface 50 of annular shape, and preshaped to the expected concavity which mates with the contour of a relative large egg. So formed, the die characters are substantially free to assume a degree of concavity corresponding to that of the particular surface actually being marked.

While certain features of the apparatus described are applicable even to single-die hand-marking devices, the various features disclosed are admirably combined in the automatic apparatus described for marking a plurality of eggs at one time, as when the eggs are carried in the usual crate. By driving the printing dies into marking engagement pneumatically, and by designing the various resilient elements with gentleness in mind, the apparatus is emminently suitable to its task of contacting the delicate eggs. The universal movement of the printing die enables correct alignment between the die character and the surface to be marked even though the latter assumes a variety of shapes and contours from one operation to the next. Moreover, by constructing the die to have a generally annular symmetry, varying degrees of concavity are directly compensated for. In addition, the apparatus is simple and inexpensive to manufacture and incorporates needed versatility by permitting most easy and convenient interchange of different die characters.

While a particular embodiment of the present invention has been shown and described, it will be obvious to those skilled in the art that changes and modifications may be made without departing from the invention in its broader aspects. Accordingly, the aim in the appended claims is to cover all such changes and modifications as follow in the true spirit and scope of the invention.

I claim:

1. Apparatus for marking eggs resting on a support, said apparatus comprising: a housing defining a closed chamber and having a planar under wall with a plurality of openings therethrough; a plurality of plungers slidably disposed for limited endwise movement individually in each of said openings; a printing die coupled to the exposed end of each of said plungers; bias means urging said plungers inwardly of said chamber; valve means coupled to said chamber admitting therein air under pressure sufficient to drive said plungers outwardly of said chamber and project said dies away therefrom; an ink pad disposed alongside said support; a reversible motor coupled to said housing for moving the latter between first and second positions disposing said dies in alignment over and adjacent said link pad and said support, respectively; means responsive to movement of said housing into said first position for actuating said valve means to move said dies into engagement with and withdraw the same from said ink pad; means responsive upon withdrawal of said dies from said ink pad for moving said housing into said second position; means responsive to movement of said housing into said second position for actuating said valve means to move said dies into gentle engagement with and withdraw the same from said eggs on said support; and means responsive upon withdrawal of said dies from said eggs for moving said housing into said first position.

2. Egg marking apparatus comprising: a plunger member movable endwise relatively toward an egg; a printing die below the lower end portion of said plunger member facing the egg and including a rigid base with an opening therein having an inner surface and a necked-down portion at its outer end; a connecting member between said plunger member and printing die having a plurality of projecting resilient prongs defining surfaces telescopable within said opening with each prong having an outwardly facing hump engageable with said inner surface upon insertion beyond and behind said necked-down portion; an element defining a socket; a rigid spheroid movably disposed and grasped by said socket; means for coupling said spheroid to one of said members; and means for coupling said socket to the other of said members.

3. The combination called for in claim 2 including a compression spring between said plunger member and connecting member for retaining said members normally in axial alignment.

4. Apparatus for marking eggs resting on a support, said apparatus comprising a housing defining a closed chamber and having a lower wall with a plurality of guide openings therethrough; a plurality of plungers slidably disposed for limited endwise movement individually in each of said guide openings; a printing die coupled to the exposed end of each of said plungers; bias means urging said plungers inwardly of said chamber; valve means coupled to said chamber admitting therein air under pressure sufficient to drive said plungers outwardly of said chamber and project said dies away therefrom; an ink pad for the dies; a reversible motor for moving the housing with respect to the ink pad between a first position disposing said dies in alignment over the ink pad and a second position with the dies to one side of the ink pad; means responsive to movement of said housing into said first position for actuating said valve means to move said dies into engagement with and withdraw the same from said ink pad; means responsive to movement of said housing and ink pad into said second relative position for actuating said valve means to move said dies into gentle engagement with and withdraw the same from said eggs on said support; and means responsive upon withdrawal of said dies from said eggs for moving said housing into said first relative position.

References Cited in the file of this patent

UNITED STATES PATENTS

| | | |
|---|---|---|
| 454,066 | Redfield | June 16, 1891 |
| 584,669 | Buttler | June 15, 1897 |
| 1,248,184 | Silverstene | Nov. 27, 1917 |
| 1,271,826 | Anderson | July 9, 1918 |
| 1,779,174 | Larsen | Oct. 21, 1930 |
| 1,906,094 | Powell | Apr. 25, 1933 |
| 1,928,715 | Wilson | Oct. 3, 1933 |
| 2,851,944 | Prohaska | Sept. 16, 1958 |
| 2,907,275 | Maki et al. | Oct. 6, 1959 |

FOREIGN PATENTS

| | | |
|---|---|---|
| 180,706 | Switzerland | May 1, 1936 |
| 479,511 | Italy | Mar. 31, 1953 |